(12) United States Patent
Brummer

(10) Patent No.: US 8,869,725 B2
(45) Date of Patent: Oct. 28, 2014

(54) METHOD AND SYSTEM FOR SENSOR-BASED INTELLIGENT SAILS

(71) Applicant: WB-Sails Ltd, Helsinki (FI)

(72) Inventor: Mikko Brummer, Helsinki (FI)

(73) Assignee: WB-Sails Ltd, Helsinki (FI)

( * ) Notice: Subject to any disclaimer, the term of this patent is extended or adjusted under 35 U.S.C. 154(b) by 59 days.

(21) Appl. No.: 13/662,633

(22) Filed: Oct. 29, 2012

(65) Prior Publication Data

US 2013/0104786 A1    May 2, 2013

Related U.S. Application Data

(60) Provisional application No. 61/554,045, filed on Nov. 1, 2011.

(51) Int. Cl.
*B63H 9/04* (2006.01)
*G06F 19/00* (2011.01)
*B64D 45/00* (2006.01)
*B63H 9/06* (2006.01)
*B64C 21/00* (2006.01)

(52) U.S. Cl.
CPC *B63H 9/06* (2013.01); *B64D 45/00* (2013.01); *G06F 19/00* (2013.01); *B63H 9/0657* (2013.01); *B64C 21/00* (2013.01)
USPC .................................. 114/102.1; 73/170.03

(58) Field of Classification Search
USPC .............. 114/39.11, 39.29, 102.1; 73/170.01, 73/170.03, 170.06, 180; 701/21
See application file for complete search history.

(56) References Cited

U.S. PATENT DOCUMENTS

| 3,654,807 | A | * | 4/1972 | Deskey | 73/180 |
| 5,877,415 | A | * | 3/1999 | Kruse | 73/170.03 |
| 7,415,935 | B2 | * | 8/2008 | Witte | 114/102.1 |
| 8,397,564 | B2 | * | 3/2013 | Voisin et al. | 73/170.03 |

* cited by examiner

*Primary Examiner* — Lars A Olson
(74) *Attorney, Agent, or Firm* — Carlos R. Villamar; The Villamar Firm PLLC

(57) ABSTRACT

Systems, methods and computer program products for sensor-based sailboat sails, including a device to detect whether a flow on a sail is attached or separated including a flow separation sensor; a device using data from the separation sensor to trim the sail; a wind history device for storing a history of wind conditions on the sail; a UV-exposure sensor for measuring UV-exposure on the sail; an acceleration sensor to measure an attitude of the sail; a stress or strain sensor to measure stretch and loading of the sail; an energy supply to provide energy to the sensors; and a data display to show data from the sensors to a user.

6 Claims, 3 Drawing Sheets

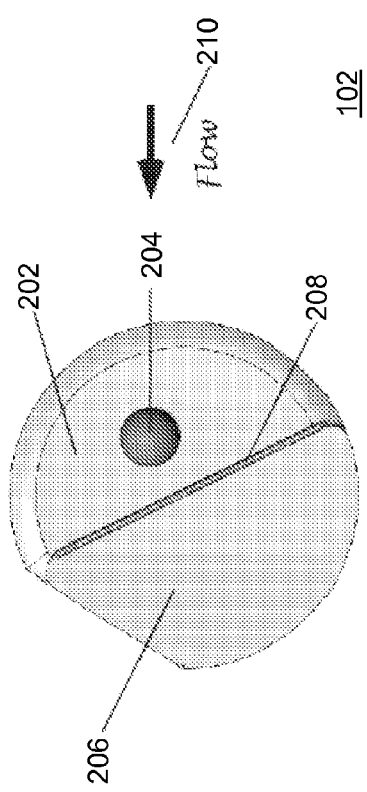
FIG. 2a
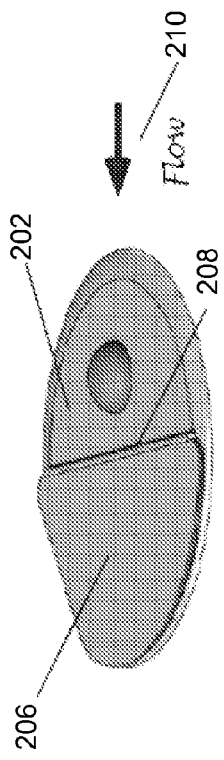
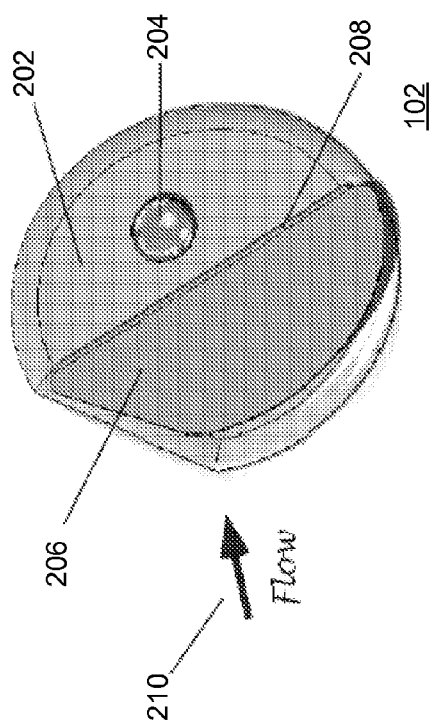
FIG. 2b
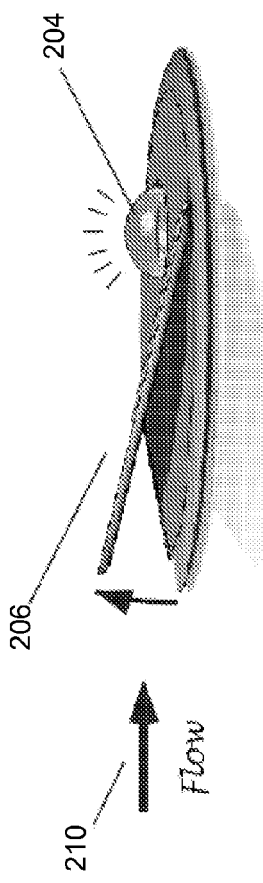

METHOD AND SYSTEM FOR SENSOR-BASED INTELLIGENT SAILS

CROSS REFERENCE TO RELATED DOCUMENTS

The present invention is related to U.S. Provisional Patent Application Ser. No. 61/554,045 of Mikko BRUMMER, entitled "METHOD AND SYSTEM FOR SENSOR-BASED INTELLIGENT SAILS," filed on Nov. 1, 2011, the entire disclosure of which is hereby incorporated by reference herein.

BACKGROUND OF THE INVENTION

1. Field of the Invention

The present invention generally relates to sails for boats, ships, planes, and the like. More particularly, the present invention includes methods and systems for sensor-based sails that can be used on all suitable types of lifting surfaces, such as sailboats sails, wings, turbine blades, and the like. Accordingly, although the disclosure describes illustrative methods and systems for sensor-based sailboat sails, and the like, the disclosed systems and methods can be applicable to any suitable surface flow, and the like.

2. Discussion of the Background

Traditionally, systems and methods regarding sails and air flow on surfaces thereof may concentrate on detecting whether the flow is laminar or turbulent (see, e.g., U.S. Pat. Nos. 5,877,415, and 7,415,935). However, there has been a lack of focus on detecting whether a flow is attached or separated, and the like.

Therefore, there is a need for a method and system for detecting whether a flow is attached or separated, and a suitable algorithm to exploit such knowledge in order, for example, to control trim of sails, and the like, for maximum performance, safety of use, and the like.

SUMMARY OF THE INVENTION

The above and other needs are addressed by embodiments of the present invention, which provide a system and method for detecting whether a flow is attached or separated (e.g., via a flow separation sensor), and the like. In addition, the systems and methods can include various suitable sensors used to monitor, collect, and the like, data or information regarding the use of a sail, or a surface submitted to a flow, and the like. Accordingly, a sail or a surface to be intelligently monitored can be fitted with one only or with all of such suitable sensors, and the like. For example, the systems and methods can include a device to detect whether a flow is attached or separated via a flow separation sensor, an algorithm to exploit such knowledge in order to trim sails for maximum performance, a wind history sensor, an ultraviolet (UV)-exposure sensor, acceleration sensors to measure attitude of a sail, stress/strain sensors to measure stretch and loading of a sail, an energy supply to provide energy to such sensors, a data display to display sensor data to a user, stitching with thread spun with a conductive material to provide electrical connectivity, and the like.

Accordingly, in illustrative aspects, there are provided systems, methods and computer program products for sensor-based sailboat sails, including a device to detect whether a flow on a sail is attached or separated including a flow separation sensor; a device using data from the separation sensor to trim the sail; a wind history device for storing a history of wind conditions on the sail; a UV-exposure sensor for measuring UV-exposure on the sail; an acceleration sensor to measure an attitude of the sail; a stress or strain sensor to measure stretch and loading of the sail; an energy supply to provide energy to the sensors; and a data display to show data from the sensors to a user.

The stitching for the sail includes thread spun with a conductive material.

The sail can include devices for determining a three dimensional shape of the sail.

Advantageously, the illustrative systems and methods for detecting whether a flow is attached or separated can be used to design a suitable algorithm to exploit such knowledge in order, for example, to control trim of sails, and the like, for maximum performance, safety of use, and the like.

Still other aspects, features, and advantages of the present invention are readily apparent from the following detailed description, simply by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIGS. 2a-2b show an illustrative flow separation sensor; and

DETAILED DESCRIPTION OF THE INVENTION

In physics, fluid dynamics is a sub-discipline of fluid mechanics that deals with fluid flow--the natural science of fluids (e.g., liquids and gases) in motion. In fluid dynamics, when a fluid is flowing over a solid surface (e.g., air over a sail surface), fluid flow can be considered to be in three different states, including (i) laminar; (2) turbulent; and (3) separated. In the first two cases, laminar or turbulent, the fluid flow is said to be attached to the surface. The flow follows in a tidy manner over the surface of the solid it is passing over, such as a sail, and the like. Even if the turbulent flow, as the name suggests, is more deranged and unstructured than laminar, it remains attached to the surface. In the third case, separated flow, the fluid physically abandons the surface it has been following, leaving a space of sluggish fluid between the external, moving flow and the solid surface.

Figure 1:
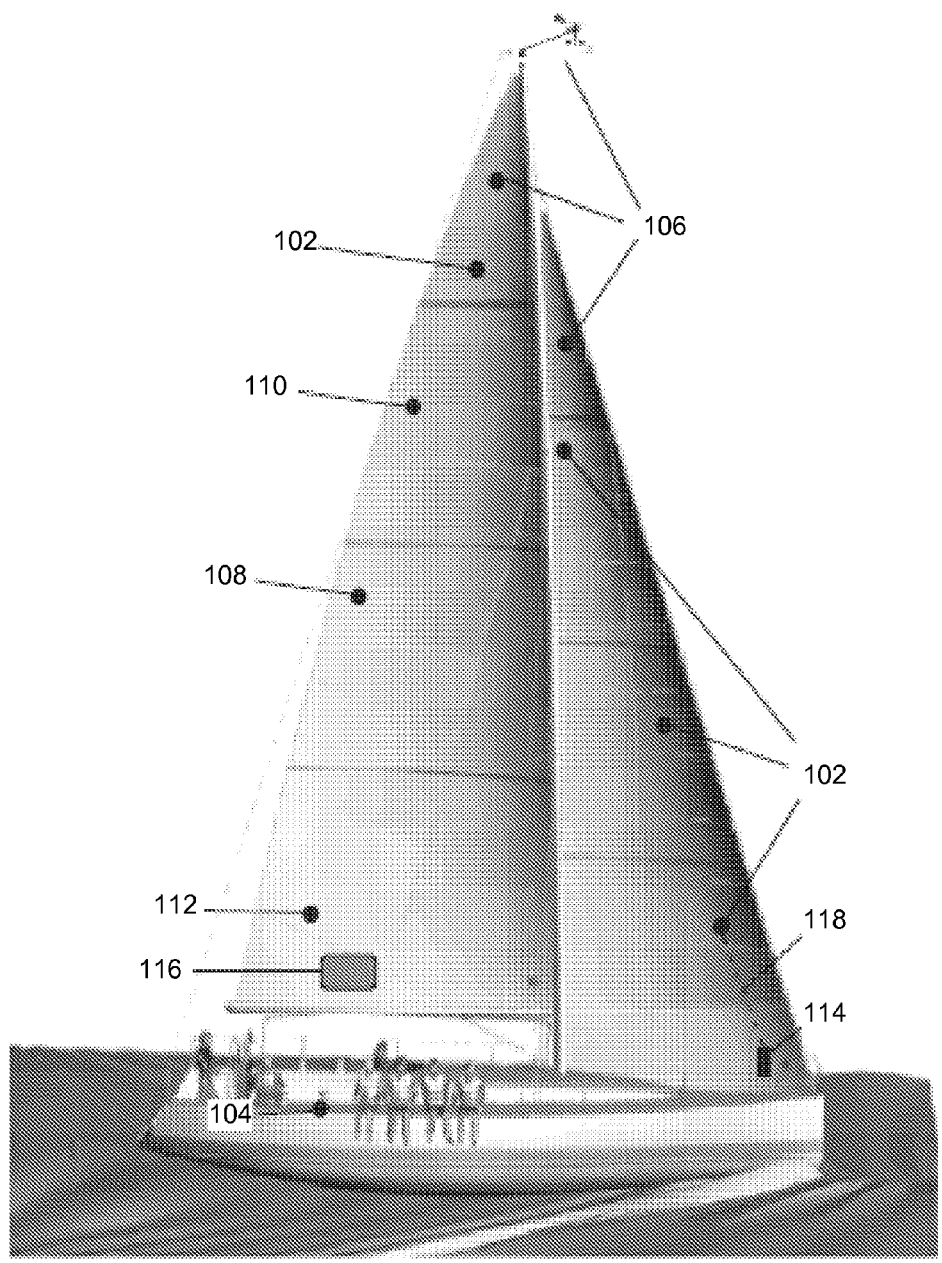
FIG. 1 shows an illustrative sailboat having sails fitted with various sensors.

Referring now to the drawings, wherein like reference words designate identical or corresponding parts throughout the several views, FIG. 1 shows an illustrative sailboat 100 having sails fitted with various sensors. In FIG. 1, flow sensors 102 can be used to monitor and detect separated flow on the surface of the sails of the sailboat 100. Two or more of the sensors 102 can be included on each sail (e.g., one on each side of a sail). To accomplish optimal trim of the sails more sensors can be employed, as needed. A suitable algorithm based on the reading of the various sensors can be stored in a memory of a microprocessor system 104 on one of the sails, or more conveniently somewhere on the sailboat 100, for example, in the vicinity of the winches that are used to control the sails. A display and/or an audible sound system 116 can be used prompt a user for trimming of the sails, or the microprocessor system 104 can be used to control directly electrical and/or hydraulic winches, and the like, which can be used to adjust the sails automatically.

Wind history sensors 106 can be conveniently placed in the upper part of the sails, where such sensors 106 can be fed, for example, wirelessly, and the like, with data from wind instruments (not shown), and the like, of the sailboat 100. Alternatively the sensors 106 could sense directly the wind by themselves. Ultraviolet UV-sensors 108 can include a photocell with a UV-filter, and the like, and can be used to store collected information into the history sensors 106, can be configured to work on its own, and the like. Acceleration sensors 110 can be used to measure a heel of the sailboat 100, which is useful for a sail trim algorithm running on the microprocessor system 104, and for measuring and issuing any suitable warnings, for example, if the sails are flogging excessively in the wind, and the like.

A strain gauge 112 can be used to measure stretch, strain, and the like, of the sails and issue a suitable warning, for example, if the stretch is becoming too large, and the like. The strain gauge 112 can be the type used in engineering applications, but can also be configured a sheet or piece of material, and the like, for example, that changes its color when stressed, and the like. Another option can be the sensor 112 configured as an RFID-tag, whose power consumption is dependent on its stretch, and the like. In this case, no internal energy source need be employed, as a passive RFID tag obtains energy from a wireless RF-reader (not shown) reading data from the RFID tag.

The various sensors described above can be supplied with energy from a suitable energy source 114, and the like. For example, energy can be gathered from the environment with the help of solar cells, motion sensitive energy harvesters, and the like (not shown). In addition, the sails can be covered with a photovoltaic material or paint sensitive to sunlight and act as a solar panel (e.g., as described in U.S. Pat. No. 7,597,388, incorporated by reference herein). Accordingly, the employed energy can be stored in the energy source 114 (e.g., via rechargeable batteries, etc.).

The data display device 116 can be made from a soft, pliable material, such as an OLED-display, and the like, can utilize electronic ink (E-ink), and the like, for low energy use, can be laminated into the sails to transfer information about the various sensors and wind instruments to the user, and the like. Electricity from the energy source 114, sensor data, and the like, can be transferred to/from the various sensors, for example, via conductive stitching 118 incorporated in the structure of the sails. For example, a thread spun with a suitable content of conductive material can be employed for such conductive stitching.

FIGS. 2a-2b show an illustrative flow separation sensor (e.g., such as the sensors 102). For example, each of the sensors 102 can include a bottom plate 202 secured to a sail or a surface to be monitored, a LED lamp 204, and a moving flap 206, wherein an axis of rotation 208 of the flap 206 and the arrow 210 depict a flow direction, and the like.

For example, in FIG. 2a, the flow 210 is going from right to left and pushes the flap 206 in a flush position with the bottom plate 202. In FIG. 2b, in a separated region, the flow 210 goes from left to right and lifts up the flap 206 from the bottom plate 202, rotating along the axis 208. The axis 208 can be equipped with an electric switch (not shown) for turning on the LED light 204 (e.g., a red LED) to signal that the flow is separated from the surface. Power to such a switch and the LED lamp 204, for example, can be supplied from a button type battery (not shown) embedded into the bottom plate 202, or from an external light source, and the like. Alternatively or in addition to employing the LED lamp 204, the sensor 102 can be equipped with a suitable transmitter (not shown) to send the sensor information via wires or wirelessly to the external display 116 and/or the microprocessor control system 104, and the like.

The sensors 102 can be placed in strategic locations on the sails or the surfaces to be monitored. By choosing the location and the orientation of the sensors, flow separation can be detected and used to optimize the trim of the sails, and the like. The microprocessor control system 104 can process the data sent from the various sensors with a suitable algorithm that can advise the user, or that can directly control the winches and/or other devices that adjust the sail trim, and the like.

The flow separation sensors 102 can be configured as detectors that react when the flow is separated from a sail or suitable surface. The detectors 102 can be purely mechanical or a combination of mechanical and electronic, and the like. The sensors 102 can provide the status of the flow either visually, electronically, in some audible manner, and the like. Such information can be used to help the sailboat 100 operator to trim the sails in a correct optimal manner, and the like. The sensors 102 can also drive directly the winches or other devices used for adjusting the sails, to find the proper trim, and the like. The sensor 102 data can be transferred wirelessly or via electrical wires or stitching in a conductive material, and the like.

Accordingly, when the flow separates, there is an associated phenomenon known as reversed flow at the surface. In an illustrative implementation, the sensor device 102 has flaps that react on the reversed flow, turning on a switch for informing that the flow is separated at that point. When the flow is attached, the flaps are pushed along and flush to the surface by the outer flow, and the switch is turned off. There is an analogy in nature where bird feathers perform in a similar manner, allowing the bird to sense whether flow over its wings is separated or not. The current disclosure employs such reversed flow flap to detect separation, but such a method can be used in other kinds of devices, as will be appreciated by those skilled in the relevant art(s). By contrast, previous flow separation detectors operate in a different manner and are not applied to sails, and the like (see, e.g., U.S. Pat. Nos. 6,380, 535, and 4,061,029).

As noted above, based on the teachings of the present disclosure, a suitable algorithm can be employed to exploit such flow separation information in order to trim sails, and the like, for maximum performance, and the like. For example, since the flow may never be entirely attached on the surface of the sail, for best performance, flow separation can be allowed to be present in some parts of the sail, with the flow being attached in most parts of the sail. Accordingly, by positioning the sensors 102 in strategic locations, optimum trim can be monitored in different winds and points of sail, and the like. Several sensors 102 on both sides of the sails can be employed to accomplish such optimum results.

The wind history sensors 106 can include a memory (e.g., a microchip, RFID tag, etc.) where information about the wind conditions the sails are being used in can be stored. The wind history sensors 106 can employ information from wind instruments of the sailboat 100 to retrieve and/or receive data, such as wind speed, wind angle, with date and time stamps, and the like. Such data can be retrieved later to provide a history of the use of the sails and used to assess the wear and expected life span of the sails, and the like.

The UV-sensors 108 can store the amount of UV-radiation at chosen intervals on a suitable memory on the sails or of the microprocessor control system 104, and the like. Such sensor information can be used to assess the wear and expected life span of the sail, and the like.

The acceleration sensors 110 can be used to monitor the motions of the sailboat 100 (e.g., pitch, roll, yaw, etc.), as well as the heel angle, and the like. As previously described, such data can be stored at chosen intervals into a suitable memory on the sails or of the microprocessor control system 104, and the like.

The stress/strain sensors 112 can be used to measure the strain of the sails in different places, and the like. The sensor data can be stored a suitable memory on the sails or of the microprocessor control system 104, and the like, or can be sent directly suitable instruments of the sailboat 100 for real time monitoring, and the like. The sensors 112 can be configured as strain gauges, based on RFID technology, made from material that changes color under stress, and the like.

The energy supply/storage device 114 can provide energy to the various sensors, as needed. Such energy can be supplied by means of soft, pliable solar cells, an energy harvester based on motion, and the like, and can be stored in batteries, and the like, for use by the various sensors.

The data display device 118 displays sensor data recorded by the various sensors and can be configured as a flexible display that can be laminated or glued on the sails, such as E-ink or OLED-displays, and the like, and which employ relatively small amounts of energy, and can readily be folded for storing, and the like.

The conductive stitching 118 can include seams or stitching on the sails that can be sewn with thread that has some electrically conductive material, and the like, spun or woven into it, and the like. For example, the conductive stitching 118 can be made from Polyester and/or Nylon mixed with a carbon fiber, which is highly conductive. The various sensors can be supplied with electricity, can be written to and read from, and the like, via such conductive stitching 118. The stitching 118 can be covered with plastic tape, and the like, to protect it from the environment. Alternatively, the structural fibers of the sails can be employed, if made from a conductive material, and the like.

Figure 3:
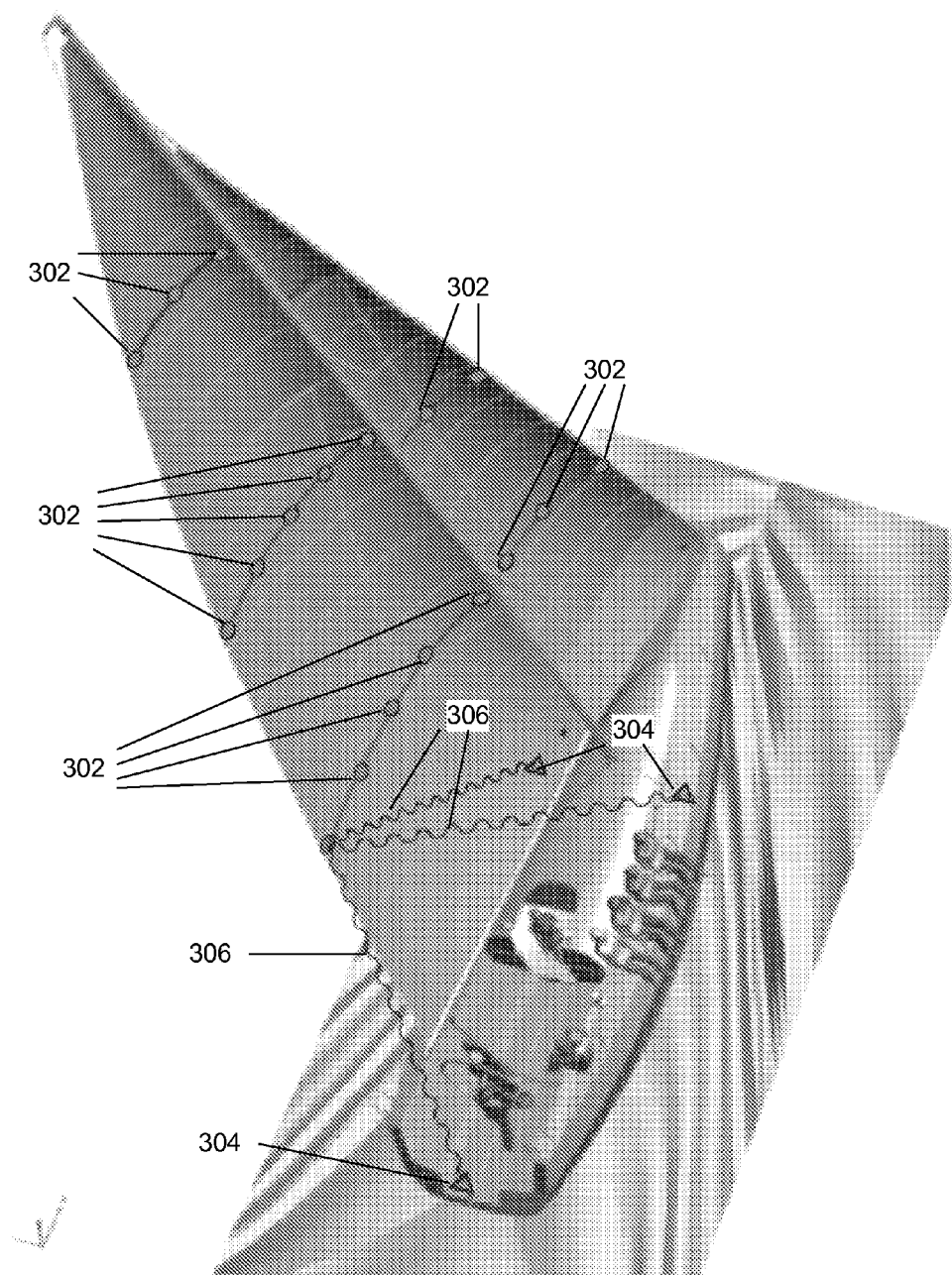
FIG. 3 shows an illustrative sailboat having sails fitted with devices for sail shape detection.

FIG. 3 shows an illustrative sailboat having sails fitted with devices for sail shape detection. In FIG. 3, sail shape detection can employ ultra or super high frequency radio waves. For example, the sails of the sailboat 100 can be equipped with one or more radio transmitters 302 that transmit signals at a very high (e.g., GHz range, infrared, etc.) frequency. The sailboat 100 also can be equipped with receivers 304 that read the signals transmitted from the transmitters 302. For example, when operating at a frequency rate of about 15 GHz, the corresponding wave length is about 10 mm and with a half-wave of 5 mm By counting the number of half waves 306 from a transmitter 302 to a receiver 304, the distance between the transmitter 302 and the receiver 304 can be calculated. With the use of several receivers 302 and transmitters 304 and triangulation, the exact location of each of the transmitters 302 in space can be determined and can be used to calculate the exact shape of the sails in three dimensions. Alternatively, if an antenna on the receivers 304 can also sense a direction of the incoming wave propagation, a single receiver 304 could be employed. The transmitters 302 on the sails can be operated in sequence, for example, at a rate of milliseconds or less, so that the sails do not appreciable move between such readings. Advantageously, from such readings, the three-dimensional shape of the sails can be constructed in real time, and used by suitable algorithms to exploit such knowledge, such as for sail trimming, control, and the like.

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, cloud computing networks, a combination thereof, and the like.

It is to be understood that the described devices and subsystems are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, pigeons, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of prospective claims.

What is claimed is:

1. A system for sensor-based sailboat sails, the system comprising:
   a device to detect whether a flow on a sail is attached or separated including a flow separation sensor;
   a device using data from the separation sensor to trim the sail;
   a wind history device for storing a history of wind conditions on the sail;
   a UV-exposure sensor for measuring UV-exposure on the sail;
   an acceleration sensor to measure an attitude of the sail;
   a stress or strain sensor to measure stretch and loading of the sail;
   an energy supply to provide energy to the sensors; and
   a data display to show data from the sensors to a user.

2. The system of claim 1, wherein stitching for the sail includes thread spun with a conductive material; and
   the sail further includes devices for determining a three dimensional shape of the sail.

3. A method for sensor-based sailboat sails, the method comprising:
   detecting with a device to including a flow separation sensor whether a flow on a sail is attached or separated;
   trimming the sail with a device using data from the separation sensor;
   storing a history of wind conditions on the sail with a wind history device;
   measuring UV-exposure on the sail with a UV-exposure sensor;
   measuring an attitude of the sail with an acceleration sensor;
   measuring stretch and loading of the sail with a stress or strain sensor;
   providing energy to the sensors with an energy supply; and
   showing data from the sensors to a user with a data display.

4. The method of claim 3, wherein stitching for the sail includes thread spun with a conductive material; and
   determining with devices included in the sail a three dimensional shape of the sail.

5. A computer program product for sensor-based sailboat sails including one or more tangible, non-transitory computer readable instructions configured to cause one or more computer processors to perform the steps of:
   detecting with a device to including a flow separation sensor whether a flow on a sail is attached or separated;
   trimming the sail with a device using data from the separation sensor;
   storing a history of wind conditions on the sail with a wind history device;
   measuring UV-exposure on the sail with a UV-exposure sensor;
   measuring an attitude of the sail with an acceleration sensor;
   measuring stretch and loading of the sail with a stress or strain sensor;
   providing energy to the sensors with an energy supply; and
   showing data from the sensors to a user with a data display.

6. The computer program product of claim 5, wherein stitching for the sail includes thread spun with a conductive material; and determining with devices included in the sail a three dimensional shape of the sail.

* * * * *